(12) United States Patent
Koh et al.

(10) Patent No.: US 10,622,677 B2
(45) Date of Patent: Apr. 14, 2020

(54) LITHIUM SECONDARY BATTERY COMPRISING DISULFONATE ADDITIVE AND METHOD OF PREPARING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Myongchun Koh, Hwaseong-si (KR); Hosang Park, Seoul (KR); Jinah Seo, Seoul (KR); Yeonji Chung, Yongin-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 76 days.

(21) Appl. No.: 15/719,936

(22) Filed: Sep. 29, 2017

(65) Prior Publication Data
US 2018/0102570 A1 Apr. 12, 2018

(30) Foreign Application Priority Data
Oct. 6, 2016 (KR) .................. 10-2016-0129082

(51) Int. Cl.
| H01M 10/0567 | (2010.01) |
| H01M 4/525 | (2010.01) |
| H01M 10/0525 | (2010.01) |
| H01M 4/36 | (2006.01) |
| H01M 4/485 | (2010.01) |
| H01M 10/04 | (2006.01) |
| H01M 10/052 | (2010.01) |
| H01M 10/0568 | (2010.01) |
| H01M 10/0569 | (2010.01) |
| H01M 4/02 | (2006.01) |

(52) U.S. Cl.
CPC ....... *H01M 10/0567* (2013.01); *H01M 4/362* (2013.01); *H01M 4/485* (2013.01); *H01M 4/525* (2013.01); *H01M 10/04* (2013.01); *H01M 10/052* (2013.01); *H01M 10/0525* (2013.01); *H01M 10/0568* (2013.01); *H01M 10/0569* (2013.01); *H01M 2004/028* (2013.01); *H01M 2300/0025* (2013.01); *Y02T 10/7011* (2013.01)

(58) Field of Classification Search
None
See application file for complete search history.

(56) References Cited

U.S. PATENT DOCUMENTS

| 6,872,493 B2 | 3/2005 | Yamada et al. |
| 7,163,768 B2 | 1/2007 | Utsugi et al. |
| 9,012,071 B2 | 4/2015 | Utsugi et al. |
| 9,236,635 B2 | 1/2016 | Abe et al. |
| 2004/0043300 A1 | 3/2004 | Utsugi et al. |
| 2010/0209782 A1* | 8/2010 | Choi .............. H01M 4/0452 429/332 |
| 2012/0202125 A1* | 8/2012 | Han ............... H01M 4/485 429/341 |
| 2012/0316716 A1* | 12/2012 | Odani ............ H01M 10/0567 701/22 |
| 2016/0322669 A1 | 11/2016 | Sawa et al. |
| 2017/0018805 A1 | 1/2017 | Yoshida |
| 2017/0204124 A1 | 7/2017 | Takahashi et al. |

FOREIGN PATENT DOCUMENTS

| EP | 3291352 A1 | 7/2018 |
| JP | 2002134169 A | 5/2002 |
| JP | 2004281368 A | 10/2004 |

(Continued)

OTHER PUBLICATIONS

Choi et al. (Journal of Power Sources 161, 2006, 1254-1259). (Year: 2006).*
European Search Report for European Patent Application No. 17193285.8 dated Dec. 11, 2017.
Qiu et al., "A study of methyl phenyl carbonate and diphenyl carbonate as electrolyte additives for high voltage LiNi0.8Mn0.1Co0.1O2/graphite pouch cells", Journal of Power Sources, 318, 2016, pp. 228-234.

(Continued)

*Primary Examiner* — Wojciech Haske
(74) *Attorney, Agent, or Firm* — Cantor Colburn LLP

(57) ABSTRACT

A lithium secondary battery including a positive electrode including a positive active material represented by Formula 1; a negative electrode; and an electrolyte disposed between the positive electrode and the negative electrode, the electrolyte including a lithium salt; a nonaqueous solvent; and a cyclic compound represented by Formula 2,
wherein an amount of the cyclic compound is less than about 2 percent by weight (wt %) based on a total weight of the electrolyte, $$Li_xNi_yM_{1-y}O_{2-z}A_z \qquad \text{Formula 1}$$

Formula 2

$$\begin{array}{c}
\text{O}=\overset{\text{O}}{\underset{\text{O}}{\overset{\|}{S}}}\overset{R_1}{\underset{R_2}{\diagdown}}\overset{\text{O}}{\underset{\text{O}}{\overset{\|}{S}}}=\text{O},
\end{array}$$

wherein, in Formulae 1 and 2,
$0.9 \leq x \leq 1.2$, $0.7 \leq y \leq 0.95$, $0 \leq z < 0.2$,
M includes Al, Mg, Mn, Co, Fe, Cr, V, Ti, Cu, B, Ca, Zn, Zr, Nb, Mo, Sr, Sb, W, Bi, or a combination thereof,
A includes a monovalent anion, a divalent anion, a trivalent anion, or a combination thereof, and
$R_1$ and $R_2$ are each independently a substituted or unsubstituted $C_1$-$C_{30}$ alkylene group.

20 Claims, No Drawings

(56) References Cited

FOREIGN PATENT DOCUMENTS

| | | |
|---|---|---|
| JP | 2015159109 A | 9/2015 |
| JP | 2016027028 A | 2/2016 |
| KR | 1020140051940 A | 5/2014 |
| WO | 2005057714 A1 | 6/2005 |
| WO | 2015152046 A1 | 10/2015 |
| WO | 2015153716 A1 | 10/2015 |
| WO | 2016103511 A1 | 6/2016 |
| WO | 2016126534 A1 | 8/2016 |

OTHER PUBLICATIONS

Xia et al., "Study of Methylene Methanedisulfonate as an Additive for Li-Ion Cells", Journal of The Electrochemical Society, 161 (1) Jan. 2014, pp. A84-A88.
European Search Report for European Patent Application No. 17 193 285.8-1108 dated May 27, 2019.

* cited by examiner

LITHIUM SECONDARY BATTERY COMPRISING DISULFONATE ADDITIVE AND METHOD OF PREPARING THE SAME

CROSS-REFERENCE TO RELATED APPLICATION

This application claims priority to and the benefit of Korean Patent Application No. 10-2016-0129082, filed on Oct. 6, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a lithium secondary battery including a disulfonate additive and to a method of preparing the lithium secondary battery.

2. Description of the Related Art

Lithium secondary batteries are used as a power source for portable electronic devices, such as camcorders, mobile phones, and laptop computers. Lithium secondary batteries are rechargeable at high rates and have an energy density per unit weight which is about three times higher than that of lead storage batteries, nickel-cadmium (Ni—Cd) batteries, nickel-hydrogen batteries, or nickel-zinc batteries.

A positive active material in a positive electrode of lithium secondary batteries may be a lithium-containing metal oxide. For example, a composite oxide of lithium and a metal such as cobalt, manganese, and/or nickel (Ni), may be used as a positive active material.

Despite advances in the development of positive active materials, there remains a need for a lithium secondary battery which exhibits an improved combination of capacity, lifespan characteristics, and resistance.

SUMMARY

Provided is a lithium secondary battery having a novel structure.

According to an aspect of an embodiment, a lithium secondary battery includes:
a positive electrode including a positive active material represented by Formula 1;
a negative electrode; and
an electrolyte disposed between the positive electrode and the negative electrode, the electrolyte including a lithium salt, a nonaqueous solvent, and a cyclic compound represented by Formula 2, wherein an amount of the cyclic compound is less than about 2 percent by weight (wt %) based on the total weight of the electrolyte,

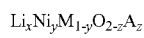

Formula 1

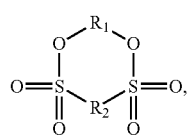

Formula 2 wherein, in Formulae 1 and 2,
$0.9 \leq x \leq 1.2$, $0.7 \leq y \leq 0.95$, $0 \leq z < 0.2$,
M comprises aluminum (Al), magnesium (Mg), manganese (Mn), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), bismuth (Bi), or a combination thereof,
A comprises a monovalent anion, a divalent anion, a trivalent anion, or a combination thereof, and
$R_1$ and $R_2$ are each independently a substituted or unsubstituted $C_1$-$C_{30}$ alkylene group,
wherein a substituent of the substituted $C_1$-$C_{30}$ alkylene group comprises a halogen, a methyl group, an ethyl group, a propyl group, an iso-propyl group, a butyl group, a tert-butyl group, a trifluoromethyl group, a tetrafluoroethyl group, a vinyl group, a propenyl group, a butenyl group, or a combination thereof.

According to an aspect of an embodiment, a method of preparing a lithium secondary battery includes:
providing a positive electrode including a positive active material represented by Formula 1;
providing a negative electrode; and
disposing an electrolyte between the positive electrode and the negative electrode, the electrolyte including a lithium salt, a nonaqueous solvent, and a cyclic compound represented by Formula 2, wherein an amount of the cyclic compound is less than about 2 percent by weight (wt %) based on the total weight of the electrolyte,

Formula 1

Formula 2

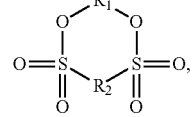

wherein, in Formulae 1 and 2,
$0.9 \leq x \leq 1.2$, $0.7 \leq y \leq 0.95$, $0 \leq z < 0.2$,
M comprises aluminum (Al), magnesium (Mg), manganese (Mn), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), bismuth (Bi), or a combination thereof,
A comprises a monovalent anion, a divalent anion, a trivalent anion, or a combination thereof, and
$R_1$ and $R_2$ are each independently a substituted or unsubstituted $C_1$-$C_{30}$ alkylene group,
wherein a substituent of the substituted $C_1$-$C_{30}$ alkylene group comprises a halogen, a methyl group, an ethyl group, a propyl group, an iso-propyl group, a butyl group, a tert-butyl group, a trifluoromethyl group, a tetrafluoroethyl group, a vinyl group, a propenyl group, a butenyl group, or a combination thereof.

Additional aspects will be set forth in part in the description which follows and, in part, will be apparent from the description, or may be learned by practice of the presented embodiments.

DETAILED DESCRIPTION

Reference will now be made in detail to various embodiments. In this regard, the present embodiments may have different forms and should not be construed as being limited to the descriptions set forth herein. Accordingly, the embodiments are merely described below to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the FIGURES. It will be understood that the spatially relative terms are intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkylene" means a straight or branched chain, saturated, aliphatic hydrocarbon group having a valence of at least two, optionally substituted with one or more substituents where indicated, provided that the valence of the alkylene group is not exceeded.

Hereinafter, a lithium secondary battery according to one or more embodiments will further be described.

A lithium secondary battery according an embodiment includes a positive electrode including a positive active material represented by Formula 1; a negative electrode; and an electrolyte disposed between the positive electrode and the negative electrode, the electrolyte comprising a lithium salt, a nonaqueous solvent, and a cyclic compound represented by Formula 2, wherein an amount of the cyclic compound is less than about 2 percent by weight (wt %), based on the total weight of the electrolyte Formula 1

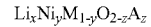

Formula 2

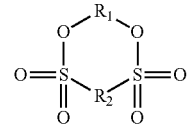

wherein, in Formulae 1 and 2,
$0.9 \leq x \leq 1.2$, $0.7 \leq y \leq 0.95$, $0 \leq z < 0.2$ M comprises aluminum (Al), magnesium (Mg), manganese (Mn), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), bismuth (Bi), or a combination thereof, A comprises a monovalent anion, a divalent anion, a trivalent anion, or a combination thereof, and $R_1$ and $R_2$ are each independently a substituted or unsubstituted $C_1$-$C_{30}$ alkylene group, wherein a substituent of the substituted $C_1$-$C_{30}$ alkylene group is a halogen, a methyl group, an ethyl group, a propyl group, an iso-propyl group, a butyl group, a tertbutyl group, a trifluoromethyl group, a tetrafluoroethyl group, a vinyl group, a propenyl group, a butenyl group, or a combination thereof.

Nickel-rich positive active materials may be used to provide a battery having an increased capacity as compared with a battery including a lithium cobalt oxide. When a lithium metal oxide having a high Ni content, e.g., the positive electrode active material represented by Formula 1, is used in a battery, the capacity of the battery may be significantly improved. However, and while not wanting to be bound by theory, it is understood that the $Ni^{3+}$ cation content may be increased in such batteries, which may result in poor lifespan characteristics and high resistance. For example, the positive active materials may have a surface having a weak structure, and thus the positive active materials may have poor lifespan characteristics and increased resistance.

Therefore, in order to resolve the aforementioned problems, the lithium secondary battery may include an electrolyte including a cyclic compound represented by Formula 2. Without being limited by theory, it is believed that in the case of Ni-rich positive active materials, the sulfonate in the cyclic compound may react with $Ni^{3+}$ cations, thereby stabilizing the $Ni^{3+}$ cations. Consequently, the resistance of the battery may decrease.

However, when the amount of the cyclic compound in the electrolyte is greater than about 2 weight percent (wt %), based on the total weight of the electrolyte, the disulfonate in the cyclic compound may react with lithium cations from the positive active material. Consequently, the lithium cations may be consumed and thus may not contribute to battery characteristics, resulting in irreversible capacity loss. In order to resolve this problem, the electrolyte included in the lithium secondary battery may include the cyclic compound in an amount of less than about 2 wt %, based on the total weight of the electrolyte. Consequently, the lithium secondary battery may have an improved combination of capacity, lifespan characteristics, and resistance.

In an embodiment, the lithium secondary battery may include the cyclic compound in an amount of about 0.1 wt % to about 1.5 wt %, based on the total weight of the electrolyte. In an embodiment, the lithium secondary battery may include the cyclic compound in an amount of about 0.1 wt % to about 1 wt %, based on the total weight of the electrolyte. In an embodiment, the lithium secondary battery may include the cyclic compound in an amount of about 0.2 wt % to about 0.5 wt %, based on the total weight of the electrolyte. In an embodiment, the lithium secondary battery may include the cyclic compound in an amount of about 0.2 wt % to about 0.45 wt %, based on the total weight of the electrolyte.

In an embodiment, in Formula 2, $R_1$ and $R_2$ may each independently be a substituted or unsubstituted methylene group or a substituted or unsubstituted ethylene group.

The electrolyte may include a lithium salt. The lithium salt may be dissolved in an organic solvent and may serve as a source of lithium ions in a battery, and may serve, for example, to promote the movement of lithium ions between a positive electrode and a negative electrode.

An anion of the lithium salt in the electrolyte may comprise $PF_6^-$, $BF_4^-$, $SbF_6^-$, $AsF_6^-$, $C_4F_9SO_3$, $ClO_4$, $AlO_2$, $AlCl_4$, $C_xF_{2x+1}SO_3$ (where x is a natural number), $(C_xF_{2x+1}SO_2)(C_yF_{2y+1}SO_2)N^+$ (where x and y are each a natural number), a halide, or a combination thereof.

For example, the lithium salt may comprise lithium difluoro(oxalate)borate (LiDFOB), $LiBF_4$, $LiPF_6$, $LiCF_3SO_3$, $(CF_3SO_2)_2NLi$, $(FSO_2)_2NLi$, or a combination thereof. In an embodiment, the lithium salt may be LiDFOB or $LiPF_6$. The structure of LiDFOB is shown below.

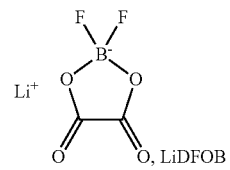

In an embodiment, the lithium salt may include LiDFOB and $LiPF_6$, and an amount of the LiDFOB may be about 2 wt % or less, about 1.8 wt % or less, about 1.5 wt % or less, about 1 wt % or less, about 0.5 wt % or less, about 0.01 wt % to about 2 wt %, about 0.05 wt % to about 1.8 wt %, or about 0.1 wt % to about 1.5 wt %, based on the total weight of the electrolyte. In an embodiment, the lithium salt may comprise, consist essentially of, or consist of LiDFOB and $LiPF_6$.

In an embodiment, the lithium salt may be $(FSO_2)_2NLi$ or $LiPF_6$. In an embodiment, the lithium salt may include $(FSO_2)_2NLi$ and $LiPF_6$, and an amount of $(FSO_2)_2NLi$ may be about 10 wt % or less, about 8 wt % or less, about 6 wt % or less, about 5 wt % or less, about 1 wt % or less, about 0.5 wt % or less, about 0.01 wt % to about 10 wt %, about 0.1 wt % to about 8 wt %, or about 1 wt % to about 5 wt %, based on the total weight of the electrolyte. In an embodiment, the lithium salt may comprise, consist essentially of, or consist of $(FSO_2)_2NLi$ and $LiPF_6$.

The lithium salt in a nonaqueous solvent-containing electrolyte may be included in an amount of about 0.001 wt % to about 30 wt %, or about 0.01 to 30 wt %, or about 0.1 to about 30 wt %, or about 0.5 to about 25 wt %, or about 0.5 to about 20 wt %, based on the total weight of the nonaqueous solvent-containing electrolyte, but embodiments are not limited to these ranges. The lithium salt in a nonaqueous solvent-containing electrolyte may be used in an amount that may enable the electrolyte to effectively transfer lithium ions and/or electrons in a charge/discharge process.

The lithium salt in a nonaqueous solvent containing electrolyte may be in included in an amount of about 100 millimolar (mM) to about 10 molar (M), or in an amount of about 250 mM to about 5 M. In an embodiment, an amount of the lithium salt in a nonaqueous solvent-containing electrolyte may be in a range of about 500 mM to about 2 M. However, the amount of the lithium salt in a nonaqueous solvent containing electrolyte is not limited to these ranges. The lithium salt in a nonaqueous solvent containing electrolyte may be used in an amount that may enable the electrolyte to effectively transfer lithium ions and/or electrons in a charge/discharge process.

For example, the nonaqueous solvent may comprise a suitable aprotic solvent, and may comprise a carbonate-based solvent, an ester-based solvent, an ether-based solvent, a ketone-based solvent, or a combination thereof. Examples of the carbonate-based solvent include dimethyl carbonate (DMC), diethyl carbonate (DEC), ethylmethyl carbonate (EMC), dipropyl carbonate (DPC), methylpropyl carbonate (MPC), ethylpropyl carbonate (EPC), ethylene carbonate (EC), propylene carbonate (PC), and butylene carbonate (BC). Examples of the ester-based solvent include methyl acetate, ethyl acetate, n-propyl acetate, t-butyl acetate, methyl propionate, ethyl propionate, γ-butyrolactone, decanolide, valerolactone, mevalonolactone, and caprolactone. Examples of the ether-based solvent include dibutyl ether, tetraglyme, diglyme, dimethoxyethane, 2-methyl tetrahydrofuran, tetraethylene glycol dimethyl ether (TEGDME), and tetrahydrofuran. An example of the ketone-based solvent may be cyclohexanone. Also disclosed is 1,2-dimethoxyethane, acetonitrile, tetrahydrofuran, dimethyl sulfoxide, γ-butyrolactone, and sulfolane. A combination comprising at least one of the foregoing may also be used.

The aprotic solvent may be used alone or in combination with another aprotic solvent. When a combination of aprotic solvents is used, a mixing ratio thereof may be appropriately adjusted according to performance of a battery, without undue experimentation by one of ordinary skill in the art.

When the carbonate-based solvent is used, a combination of a linear carbonate and a cyclic carbonate may be used. In this case, performance of the electrolyte may be improved when the linear carbonate and the cyclic carbonate are mixed at a volume ratio of about 1:1 to about 9:1.

In an embodiment, fluoro-ethylene carbonate (FEC), vinylene carbonate (VC), vinylethylene carbonate (VEC), a phosphine compound, a phosphite compound, a phosphate compound, propane sultone (PS), or a combination thereof may further be included in the nonaqueous solvent.

In an embodiment, the nonaqueous solvent may include fluoro-ethylene carbonate (FEC). In an embodiment, the lithium secondary battery may include FEC in an amount of about 7 volume percent (vol %) or less, based on the total volume of the nonaqueous solvent. In an embodiment, the lithium secondary battery may include FEC in an amount of about 0.5 vol % to about 7 vol %, based on the total volume of the nonaqueous solvent. In an embodiment, the lithium secondary battery may include FEC in an amount of about 1 vol % to about 7 vol %, based on the total volume of the nonaqueous solvent. In an embodiment, the lithium secondary battery may include FEC in an amount of about 2 vol % to about 7 vol %, based on the total volume of the nonaqueous solvent.

In an embodiment, the electrolyte may include VC, VEC, maleic anhydride, succinic anhydride, or a combination thereof. In an embodiment, the lithium secondary battery may further include VC, VEC, maleic anhydride, succinic anhydride, or a combination thereof in an amount of less than about 2 vol %, based on the total volume of the electrolyte. In an embodiment, the lithium secondary battery may further include VC, VEC, maleic anhydride, succinic anhydride, or a combination thereof in an amount of about 0.1 vol % to about 2 vol %, based on the total volume of the electrolyte. In an embodiment, the lithium secondary battery may further include VC, VEC, maleic anhydride, succinic anhydride, or a combination thereof in an amount of about 0.1 vol % to about 1 vol %, based on the total volume of the electrolyte.

In an embodiment, the electrolyte may include, but is not limited to, maleic anhydride.

In an embodiment, the electrolyte may further include an additive including a phosphine compound, a phosphite compound, a phosphate compound, or a combination thereof. In an embodiment, the lithium secondary battery may include the additive in an amount of less than about 3 wt %, based on the total weight of the electrolyte. In an embodiment, the lithium secondary battery may include the additive in an amount of about 0.1 wt % to about 3 wt %, based on the total weight of the electrolyte. In an embodiment, the lithium secondary battery may include the additive in an amount of about 0.1 wt % to about 2 wt %, based on the total weight of the electrolyte.

The phosphine compound may be, for example, triphenylphosphine, tris(4-fluorophenyl) phosphine, tris(2,4-difluorophenyl)phosphine, or tris(perfluorophenyl)phosphine, but embodiments of the phosphine compound are not limited thereto. The phosphate compound may be, for example, trimethyl phosphate, triethyl phosphate, tripropyl phosphate, or tributyl phosphate, but embodiments of the phosphate compound are not limited thereto. The phosphite compound may be, for example, triethyl phosphite, trimethyl phosphite, tripropyl phosphite, tributyl phosphite, or tris(trimethylsilyl) phosphite, but embodiments of the phosphite compound are not limited thereto.

The cyclic compound represented by Formula 2 may readily be decomposed by reaction with a negative electrode. Also, as is further described below, a lithium secondary battery including a negative active material including a metal or a metalloid alloyable with lithium or a carbonaceous negative active material may have a problem of gas generation due to catalytic action at a high temperature, which results in deterioration of the lifespan characteristics of the battery. When FEC, VC, and/or VEC, alone or in combination with an additive, is included in the electrolyte within the above-described ranges, a passivation film containing a reaction product of the foregoing materials (i.e., a solid electrolyte interface (SEI) film), may be formed on a portion of a surface or on the entire surface of a negative electrode. The SEI film may prevent decomposition of the cyclic compound represented by Formula 2 and prevent generation of a gas during storage of the battery at a high temperature, and thus, may improve safety and performance of a battery.

Hereinafter, the configuration of the lithium secondary battery will be described in further detail.

The positive electrode may include the positive active material represented by Formula 1, in which, for example, A in Formula 1 may include halogen, S, N, or a combination thereof, but is not limited thereto.

In an embodiment, in Formula 1, 0.8≤y≤0.95.

In an embodiment, the positive active material may be represented by Formula 3 or 4:

$$LiNi_{y'}Co_{1-y'-z'}Al_{z'}O_2 \quad \text{Formula 3}$$

$$LiNi_{y'}Co_{1-y'-z'}Mn_{z'}O_2 \quad \text{Formula 4}$$

wherein, in Formulae 3 and 4, 0.8≤y'≤0.95, 0<z'<0.1, and 0≤z'1−y'−z'<0.2.

For example, the positive electrode may include a positive active material selected from $LiNi_{0.8}Co_{0.15}Al_{0.05}O_2$, $LiNi_{0.88}Co_{0.1}Al_{0.02}O_2$, $LiNi_{0.85}Co_{0.1}Al_{0.05}O_2$, $LiNi_{0.8}Co_{0.15}Mn_{0.05}O_2$, $LiNi_{0.88}Co_{0.1}Mn_{0.02}O_2$, $LiNi_{0.85}Co_{0.1}Mn_{0.05}O_2$, or a combination thereof.

The positive electrode may further include lithium cobalt oxide, lithium nickel cobalt manganese oxide, lithium nickel cobalt aluminum oxide, lithium iron phosphate, lithium manganese oxide, or combination thereof, in addition to the foregoing positive active materials, but embodiments of the positive active material is not limited thereto. Any suitable positive active material available may further be included in the positive electrode.

For example, the positive electrode may further include a positive active material represented by any one of the following formulae: $Li_aA_{1-b}B'_bD_2$ (wherein 0.90≤a≤1.8 and 0≤b≤0.5); $Li_aE_{1-b}B'_bO_{2-c}D_c$ (wherein 0.90≤a≤1.8, 0≤b≤0.5, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (wherein $0.90 \leq a \leq 1.8$, $0 \leq b \leq 0.05$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); $LiFePO_4$; or a combination thereof.

In the foregoing formulae, A may include nickel (Ni), cobalt (Co), manganese (Mn), or a combination thereof; B' may include Al, Ni, Co, Mn, Cr, Fe, magnesium (Mg), strontium (Sr), V, a rare-earth element, or a combination thereof; D may include oxygen (O), fluorine (F), sulfur (S), phosphorus (P), or a combination thereof; E may include Co, Mn, or a combination thereof; F' may include F, S, P, or a combination thereof; G may include Al, Cr, Mn, Fe, Mg, lanthanum (La), cerium (Ce), Sr, V, or a combination thereof; Q may include Ti, Mo, Mn, or a combination thereof; I' may include Cr, V, Fe, scandium (Sc), yttrium (Y), or a combination thereof; and J may include V, Cr, Mn, Co, Ni, Cu, or a combination thereof.

A positive electrode may be prepared by the method described below.

The positive electrode may be prepared by applying, drying, and pressing a positive electrode active material on a positive electrode current collector. In addition to the above-described positive electrode active materials, a positive active material composition in which a binder and a solvent are mixed may be prepared.

The positive active material composition may further include a conductive agent or a filler.

In an embodiment, the positive active material composition may be directly coated on a metallic current collector and then dried to prepare a positive electrode plate. In an embodiment, the positive active material composition may be cast on a separate support to form a positive active material film, which may then be separated from the support and laminated on a metallic current collector to prepare a positive electrode plate.

In an embodiment, a loading level of a prepared positive active material composition may be about 30 milligrams per square centimeter ($mg/cm^2$) or greater, and in an embodiment, about 35 $mg/cm^2$ or greater, and in an embodiment, about 40 $mg/cm^2$ or greater. In addition, an electrode density of the positive electrode may be about 3 grams per cubic centimeter (g/cc) or greater, and in an embodiment, about 3.5 g/cc or greater.

In an embodiment, in order to achieve a high cell energy density, a loading level of the prepared positive active material composition may be about 35 $mg/cm^2$ to about 50 $mg/cm^2$, or about 35 $mg/cm^2$ to about 45 $mg/cm^2$, or about 35 $mg/cm^2$ to about 40 $mg/cm^2$, and an electrode density thereof may be about 3 g/cc to about 8 g/cc, or about 3 g/cc to about 6 g/cc, or about 3.5 g/cc to about 4.2 g/cc.

In an embodiment, both surfaces of the positive electrode plate may be coated with the positive active material composition at a loading level of about 37 $mg/cm^2$ and at an electrode density of about 3.6 g/cc.

When a loading level and an electrode density of the positive active material composition are within the above ranges, a battery including a positive electrode prepared from the positive active material composition may have a high cell energy density of about 500 watt-hours per liter (Wh/L) or greater, or about 600 Wh/L or greater, or about 750 Wh/L or greater. For example, the battery may have a cell energy density of about 500 Wh/L to about 900 Wh/L, or about 550 to about 900 Wh/L, or about 600 to about 800 Wh/L.

Examples of the solvent include, but are not limited to, N-methylpyrrolidone (NMP), acetone, and water. An amount of the solvent may be in a range of about 10 parts to about 100 parts by weight, or about 20 to about 80 parts by weight, or about 30 to about 75 parts by weight, based on 100 parts by weight of the positive active material. When the amount of the solvent is within this range, a process for forming the positive active material layer may be performed efficiently.

The conductive agent may usually be added in an amount of about 1 wt % to about 30 wt %, or about 2 wt % to about 25 wt %, or about 5 wt % to about 20 wt %, based on a total weight of a mixture including a positive active material. The conductive agent may be any material having suitable electrical conductivity without causing an undesirable chemical change in a battery. Examples of the conductive agent include graphite, such as natural graphite or artificial graphite; a carbonaceous material, such as carbon black, acetylene black, Ketjen black, channel black, furnace black, lamp black, or summer black; conductive fibers, such as carbon fibers or metal fibers; fluorinated carbon, a metal powder of aluminum, or nickel; a conductive whisker, such as zinc oxide or potassium titanate; a conductive metal oxide, such as titanium oxide; and a conductive polymer, such as a polyphenylene derivative. A combination comprising at least one of the foregoing may also be used.

The binder is a component which may assist in bonding of an active material to a conductive agent and to a current collector, and may be added in an amount of about 1 wt % to about 30 wt %, or about 2.5 wt % to about 25 wt %, or about 5 wt % to about 20 wt %, based on the total weight of a mixture including a positive active material. Examples of the binder may include polyvinylidene fluoride (PVdF), polyvinylidene chloride, polybenzimidazole, polyimide, polyvinyl acetate, polyacrylonitrile, polyvinyl alcohol (PVA), carboxymethyl cellulose (CMC), starch, hydroxypropyl cellulose, regenerated cellulose, polyvinyl pyrrolidone, tetrafluoroethylene, polyethylene, polypropylene, polystyrene, polymethylmethacrylate, polyaniline, acrylonitrile butadiene styrene, a phenol resin, an epoxy resin, polyethylene terephthalate, polytetrafluoroethylene, polyphenylene sulfide, polyamideimide, polyetherimide, polyether sulfone, polyamide, polyacetal, polyphenylene oxide, polybutylene terephthalate, an ethylene-propylene-diene monomer (EPDM), a sulfonated EPDM, a styrene-butadiene rubber, a fluorine rubber, various suitable copolymers, or a combination thereof. The filler may optionally be included as a component for suppressing expansion of a positive electrode. The filler may not be particularly limited, and may be any suitable fibrous material which does not cause an undesirable chemical change in a battery. For example, the filler may be a fibrous material, such as an olefin-based polymer, e.g., polyethylene or polypropylene; glass fibers; carbon fibers, or a combination thereof.

Amounts of the positive active material, the conductive agent, the filler, the binder, and the solvent may substantially be determined by those of skill in the art without undue experimentation. At least one of the conductive agent, the filler, the binder, and the solvent may be omitted depending upon the desired use and structure of a lithium battery.

In an embodiment, NMP may be used as a solvent, PVdF or a PVdF copolymer may be used as a binder, and carbon black or acetylene black may be used as a conductive agent. For example, about 94 wt % of a positive active material, about 3 wt % of a binder, and about 3 wt % of a conductive agent may be mixed in powder form, and then NMP may be added thereto such that a slurry is formed having a solids content of about 70 wt %. This slurry may then be coated, dried, and rolled to prepare a positive electrode plate.

The positive electrode current collector may be, in general, prepared to have a thickness in a range of about 3 micrometers (µm) to about 50 µm, or about 4 µm to about 45 µm, or about 5 µm to about 30 µm. The positive electrode current collector is not particularly limited, and may be any suitable material as long as the positive electrode current collector is electrically conductive and does not cause an undesirable chemical change in a battery. Examples of the positive electrode current collector include stainless steel, aluminum, nickel, titanium, and sintered carbon. For example, the positive electrode current collector may include aluminum or stainless steel, the aluminum and the stainless steel each being surface-treated with carbon, nickel, titanium, or silver. The positive electrode current collector may be processed to have fine bumps on surfaces thereof so as to enhance a binding force of the positive active material to the current collector. The positive electrode current collector may be used in any form or shape, including a film, a sheet, a foil, a net, a porous structure, a foam, and a non-woven fabric.

In an embodiment, the negative electrode may include a negative active material including a metal or a metalloid alloyable with lithium and/or a carbonaceous negative active material.

In an embodiment, the negative active material may include a metalloid alloyable with lithium which may include silicon (Si), a silicon-carbon composite material, and $SiO_{a'}$ (wherein $0<a'<2$).

In an embodiment, the silicon-carbon composite may include Si particles. The Si particles in the silicon-carbon composite material may have an average diameter of about 200 nanometers (nm) or less, or about 150 nm or less, or about 100 nm or less.

In addition to the aforementioned negative active materials, the negative active material may include tin (Sn), Al, germanium (Ge), lead (Pb), Bi, Sb, a Si—Y' alloy (wherein Y' may be an alkali metal, an alkaline earth-metal, a Group 13 to 16 element, a transition metal, a rare-earth element, or a combination thereof, and Y' may not be Si), a Sn—Y' alloy (wherein Y' may be an alkali metal, an alkaline earth-metal, a Group 13 to 16 element, a transition metal, a rare-earth element, or a combination thereof, and Y may not be Sn), or a combination thereof. Y' may be Mg, Ca, Sr, barium (Ba), radium (Ra), Sc, Y, Ti, Zr, hafnium (Hf), rutherfordium (Rf), V, Nb, tantalum (Ta), dubnium (Db), Cr, Mo, W, seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, Bi, S, selenium (Se), tellurium (Te), polonium (Po), or a combination thereof.

A negative electrode may be prepared by the following method.

The negative electrode may be prepared by applying, drying, and pressing a negative electrode active material on a negative electrode current collector. In addition to the above-described negative electrode active materials, a negative active material composition in which a binder and a solvent are mixed may be prepared.

The negative active material composition may further include a conductive agent or a filler.

In an embodiment, the binder, the solvent, the conductive agent, and the filler used for the positive active material composition, may also be similarly used for the negative active material composition.

Water may also be used as a solvent in the negative active material composition. In an embodiment, water may be used as a solvent; CMC, SBR, acrylate, or a methacrylate-based polymer may be used as a binder; and carbon black or acetylene black may be used as a conductive agent. For example, about 94 wt % of a negative active material, about 3 wt % of a binder, and about 3 wt % of a conductive agent may be mixed in powder form, and then water may be added thereto such that a slurry is formed with a solids content of about 70 wt %. This slurry may be then coated, dried, and rolled to prepare a negative electrode plate.

An amount of the prepared negative active material composition may be determined based upon the amount of the positive active material composition.

In an embodiment, a loading level of the negative active material composition may be, based upon capacity per gram, about 12 $mg/cm^2$ or greater, and in an embodiment, about 15 $mg/cm^2$ or greater, or about 20 $mg/cm^2$ or greater. An electrode density thereof may be about 1.5 g/cc or greater, and in some embodiments, about 1.6 g/cc or greater, or about 1.8 g/cc or greater.

In an embodiment, in order to achieve a high cell energy density, a loading level of the prepared negative active material composition may be about 15 $mg/cm^2$ to about 25 $mg/cm^2$, or about 15 to about 23, or about 17 to about 22 $mg/cm^2$, and an electrode density thereof may be about 1.6 g/cc to about 2.3 g/cc, or about 1.6 g/cc to about 2.2 g/cc, or about 1.7 g/cc to about 2.1 g/cc.

When a loading level and an electrode density of the negative active material composition are within the above ranges, a battery including a negative electrode prepared from the negative active material composition may have a high cell energy density of about 500 Wh/L or greater, or about 600 Wh/L or greater, or about 750 Wh/L or greater.

The negative electrode current collector may be, in general, prepared to have a thickness in a range of about 3 µm to about 50 µm, or about 4 µm to about 40 µm, or about 5 µm to about 30 µm. The negative electrode current collector is not particularly limited, and may be any suitable material as long as the negative electrode current collector has a desired electrical conductivity without causing an undesirable chemical change in a battery. Examples of the negative electrode current collector may include copper, stainless steel, aluminum, nickel, titanium, sintered carbon; copper or stainless steel, the copper and the stainless steel each being surface-treated with carbon, nickel, titanium, or silver; or an aluminum-cadmium alloy. In addition, like the positive electrode current collector, the negative electrode current collector may be include fine bumps on surfaces of the negative electrode current collector to enhance a binding between the negative active material and the current collector. The negative electrode current collector may be have any suitable form or shape, including for example, a film, a sheet, a foil, a net, a porous structure, a foam, and a non-woven fabric.

In an embodiment, the lithium secondary battery may exhibit an increase in direct current internal resistance (DCIR) of less than about 140% after 300 charge/discharge cycles at a temperature of about 45° C., a charge/discharge current of 1 C/1 C, an operating voltage in a range of about 2.8 volts (V) to about 4.3 V, and a cut-off current in a constant-current constant voltage (CC-CV) mode of 1/10 C. The C rate is a charge and discharge rate of a cell, and is obtained by dividing a total capacity of the cell by a total discharge period of time of 1 h, e.g., a C rate for a battery having a discharge capacity of 1.6 ampere-hours would be 1.6 amperes.

That is, the lithium secondary battery may have an increase in DCIR which is significantly lower than Ni-rich lithium secondary batteries. Accordingly, the lithium secondary battery may exhibit excellent battery characteristics.

For example, an operating voltage of the lithium secondary battery may be in a range of about 2.8 V to about 4.3 V.

For example, an energy density of the lithium secondary battery may be about 500 Wh/L or greater, or about 600 Wh/L or greater, or about 750 Wh/L or greater.

In an embodiment, the lithium secondary battery may further include a separator between the positive electrode and the negative electrode. The separator may be an insulating thin film having excellent ion permeability and mechanical strength. The separator may have a pore diameter in a range of about 0.001 μm to about 1 μm, or about 0.01 μm to about 750 nm, or about 0.1 μm to about 500 nm, and a thickness thereof may be in a range of about 3 μm to about 30 μm, or about 5 μm to about 25 μm, or about 7.5 μm to about 20 μm. Examples of the separator include a chemically resistant and hydrophobic olefin-based polymer, e.g., polypropylene, a sheet or non-woven fabric formed of glass fiber or polyethylene, or a combination thereof. When a solid electrolyte is used as an electrolyte, the solid electrolyte may serve as a separator.

The electrolyte may further include, in addition to the foregoing electrolyte, an organic solid electrolyte and an inorganic solid electrolyte.

Examples of the organic solid electrolyte include a polyethylene derivative, a polyethylene oxide derivative, a polypropylene oxide derivative, a phosphoric acid ester polymer, polyester sulfide, a polyvinyl alcohol, PVdF, and a polymer including a dissociable ionic group. A combination comprising at least one of the foregoing may also be used.

Examples of the inorganic solid electrolyte include a lithium nitride, such as $Li_3N$, $Li_5NI_2$, $Li_3N$—LiI—LiOH; LiI, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$Si_2$; and a halide; and a sulfate. A combination comprising at least one of the foregoing may also be used.

The lithium secondary battery may be prepared by any suitable method. For example, the lithium secondary battery may be prepared by injecting an electrolyte between a positive electrode and a negative electrode.

The aforementioned positive electrode, negative electrode, and separator may be wound or folded, and then sealed in a battery case. Then, the battery case may be filled with an electrolyte and sealed by a cap assembly member to thereby complete the preparation of a lithium secondary battery. The battery case may be a cylindrical type, a rectangular type, or a thin-film type.

The lithium secondary battery may be classified as a winding type or a stack type depending on a structure of the electrodes, and the lithium secondary battery may be a cylindrical type, a rectangular type, a coin type, or a pouch type, depending on an exterior shape thereof.

Methods of manufacturing a lithium secondary battery are widely known in the art and thus a detailed description thereof is omitted.

According to an aspect, a battery module may include the lithium secondary battery as a unit cell.

According to another aspect, a battery pack may include the battery module.

According to still another aspect, a device may include the battery pack. Examples of the device include power tools powered by an electric motor, such as electric cars, e.g., electric vehicles (EVs), hybrid electric vehicles (HEVs), plug-in hybrid electric vehicles (PHEVs), electric two-wheeled vehicles, e.g., e-bikes and e-scooters, electric golf carts, and power storage systems. However, embodiments of the device are not limited thereto.

In addition, the lithium secondary battery may be used in any applications that require high-power output and a high voltage, and which operate under high-temperature conditions.

Hereinafter example embodiments will be described in detail with reference to Examples and Comparative Examples. These examples are provided for illustrative purposes only and are not intended to limit the scope of the inventive concept.

EXAMPLES

Example 1

Preparation of Positive Electrode $LiNi_{0.8}Co_{0.15}Al_{0.05}O_2$ as a positive active material, carbon black as a conductive agent, and PVdF as a binder were mixed together at a weight ratio of 94:3:3. Then, the mixture was mixed with NMP to prepare a slurry. The slurry was dispersed to a loading level of 37 mg/cm$^2$ and coated on both sides of an aluminum foil having a thickness of 12 μm, dried, and then rolled to prepare a positive electrode having an electrode density of 3.6 g/cc.

Preparation of Negative Electrode

SCN1 (a composite negative active material obtained by dispersing Si particles having an average particle diameter of 150 nm on graphite particles and carbon-coating the resulting particles; available from BTR), graphite, CMC, and SBR were mixed together at a weight ratio of 25:73:1.5:0.5. Then, the mixture was mixed with NMP to prepare a slurry. The slurry was dispersed to a loading level of 18.42 mg/cm$^2$ and coated on a copper foil having a thickness of 10 μm, dried, and then rolled to prepare a negative electrode having an electrode density of 1.65 g/cc. In this case, Si particles were on graphite to prepare the SCN1.

Preparation of Electrolyte 1 vol % of VC, based on a total volume of an electrolyte, was added to 1.15 M $LiPF_6$ mixed with EC, FEC, EMC, and DMC (at a volume ratio of 7:7:46:40), and 0.45 wt % of methylene methane disulfonate (MMDS), based on a total weight of the electrolyte, was further added thereto to prepare the electrolyte.

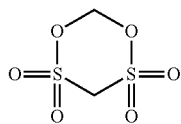

MMDS

Preparation of Lithium Secondary Battery

A separator prepared from polypropylene and having a thickness of 16 μm was disposed between the positive electrode and the negative electrode, and the electrolyte was injected thereto to prepare a lithium secondary battery.

Comparative Example 1

A lithium secondary battery was prepared in substantially the same manner as in Example 1, except that MMDS was not used in preparation of the electrolyte.

Example 2

A lithium secondary battery was prepared in substantially the same manner as in Example 1, except that $LiNi_{0.8}Co_{0.15}Mn_{0.05}O_2$ was used in place of $LiNi_{0.8}Co_{0.15}Al_{0.05}O_2$ as a positive active material, and 0.4 wt % of MMDS was added to an electrolyte, based on a total weight of the electrolyte.

Comparative Example 2

A lithium secondary battery was prepared in substantially the same manner as in Example 2, except that MMDS was not used in preparation of an electrolyte.

Example 3

A lithium secondary battery was prepared in substantially the same manner as in Example 2, except that 0.2 wt % of MMDS was added to an electrolyte, based on a total weight of the electrolyte.

Comparative Example 3

A lithium secondary battery was prepared in substantially the same manner as in Example 2, except that 2.2 wt % of MMDS was added to an electrolyte, based on a total weight of the electrolyte.

Example 4

A lithium secondary battery was prepared in substantially the same manner as in Example 3, except that, in place of the negative electrode of Example 3, a negative electrode prepared as follows was used: a mixture of graphite, CMC, and SBR at a weight ratio of 98:1.5:0.5 was mixed with NMP to prepare a slurry, and the slurry was dispersed to a loading level of 21.86 mg/cm$^2$ and coated on a copper foil having a thickness of 10 μm, dried, and then rolled to prepare a negative electrode having an electrode density of 1.65 g/cc.

Example 5

Preparation of Positive Electrode
The positive electrode prepared in Example 2 was used as a positive electrode.

Preparation of Negative Electrode
SCN2 (an active material obtained by dispersing Si particles having an average particle diameter of 100 nm on graphite particles and carbon-coating the resulting particles, available from BTR), graphite, CMC, and SBR were mixed together at a weight ratio of 13:85:1.5:0.5. Then, the mixture was mixed with NMP to prepare a slurry. The slurry was dispersed to a loading level of 21.86 mg/cm$^2$ and coated on a copper foil having a thickness of 20 μm, dried, and then rolled to prepare a negative electrode. In this case, Si particles were inside as well as on graphite in the SCN2.

Preparation of Electrolyte
1 vol % of VC, based on a total volume of an electrolyte, was added to 1.15 M $LiPF_6$ mixed with EC, FEC, EMC, and DMC (at a volume ratio of 17:3:40:40), and 1 wt % of triphenyl phosphine and 0.45 wt % of MMDS, based on a total weight of the electrolyte, were further added thereto to prepare the electrolyte.

Preparation of Lithium Secondary Battery
A separator prepared from polypropylene and having a thickness of 16 μm was disposed between the positive electrode and the negative electrode, and the electrolyte was injected thereto to prepare a lithium secondary battery.

Comparative Example 4

A lithium secondary battery was prepared in substantially the same manner as in Example 5, except that MMDS was not used in preparation of an electrolyte.

Example 6

Preparation of Positive Electrode
The positive electrode prepared in Example 1 was used as a positive electrode.

Preparation of Negative Electrode
SiO, graphite, CMC, and SBR were mixed together at a weight ratio of 13:85:1.5:0.5. Then, the mixture was mixed with NMP to prepare a slurry. The slurry was dispersed to a loading level of 18.4 mg/cm$^2$ and coated on a copper foil having a thickness of 10 μm, dried, and then rolled to prepare a negative electrode having an electrode density of 1.65 g/cc.

Preparation of Electrolyte
1 vol % of VC, based on a total volume of an electrolyte, was added to 1.15 M $LiPF_6$ mixed with EC, FEC, EMC, and DMC (at a volume ratio of 7:7:46:40), and 1 wt % of triphenyl phosphine and 0.45 wt % of MMDS, based on a total weight of the electrolyte, were further added thereto to prepare the electrolyte.

Preparation of Lithium Secondary Battery
A separator prepared from polypropylene and having a thickness of 16 μm was disposed between the positive electrode and the negative electrode, and the electrolyte was injected thereto to prepare a lithium secondary battery.

Comparative Example 5

A lithium secondary battery was prepared in substantially the same manner as in Example 6, except that MMDS was not used in preparation of an electrolyte.

Example 7

Preparation of Positive Electrode
The positive electrode prepared in Example 2 was used as a positive electrode.

Preparation of Negative Electrode

The negative electrode prepared in Example 2 was used as a negative electrode.

Preparation of Electrolyte 1 vol % of VC, based on a total volume of an electrolyte, was added to 1.15 M $LiPF_6$ mixed with EC, FEC, EMC, and DMC (at a volume ratio of 7:7:46:40), and 1 wt % of tri(4-fluorophenyl)phosphine and 0.45 wt % of MMDS, based on a total weight of the electrolyte, were further added thereto to prepare the electrolyte.

Preparation of Lithium Secondary Battery

A separator prepared from polypropylene and having a thickness of 16 μm was disposed between the positive electrode and the negative electrode, and the electrolyte was injected thereto to prepare a lithium secondary battery.

Comparative Example 6

A lithium secondary battery was prepared in substantially the same manner as described in Example 7, except that MMDS was not used in preparation of an electrolyte.

Example 8

Preparation of Positive Electrode

The positive electrode prepared in Example 1 was used as a positive electrode.

Preparation of Negative Electrode

The negative electrode prepared in Example 4 was used as a negative electrode.

Preparation of Electrolyte 1 vol % of VC, based on a total volume of an electrolyte, was added to 1.15 M $LiPF_6$ mixed with EC, FEC, EMC, and DMC (at a volume ratio of 7:7:46:40), and 1 wt % of LiDFOB and 1 wt % of MMDS, based on a total weight of the electrolyte, were further added thereto to prepare the electrolyte.

Preparation of Lithium Secondary Battery

A separator prepared from polypropylene and having a thickness of 16 μm was disposed between the positive electrode and the negative electrode, and the electrolyte was injected thereto to prepare a lithium secondary battery.

Example 9

Preparation of Positive Electrode

The positive electrode prepared in Example 1 was used as a positive electrode.

Preparation of Negative Electrode

The negative electrode prepared in Example 4 was used as a negative electrode.

Preparation of Electrolyte 1 vol % of VC, based on a total volume of an electrolyte, was added to 1.15 M $LiPF_6$ mixed with EC, FEC, EMC, and DMC (at a volume ratio of 7:7:46:40), and 1 wt % of LiDFOB and 1.5 wt % of MMDS, based on a total weight of the electrolyte, were further added thereto to prepare the electrolyte.

Preparation of Lithium Secondary Battery

A separator prepared from polypropylene and having a thickness of 16 μm was disposed between the positive electrode and the negative electrode, and the electrolyte was injected thereto to prepare a lithium secondary battery.

Comparative Example 7

Preparation of Positive Electrode

The positive electrode prepared in Example 1 was used as a positive electrode.

Preparation of Negative Electrode

The negative electrode prepared in Example 4 was used as a negative electrode.

Preparation of Electrolyte 2.4 vol % of VC, based on a total volume of an electrolyte, was added to 1.15 M $LiPF_6$ mixed with EC, FEC, EMC, and DMC (at a volume ratio of 7:7:46:40), and 1 wt % of LiDFOB and 1.5 wt % of MMDS, based on a total weight of the electrolyte, were further added thereto to prepare the electrolyte.

Preparation of Lithium Secondary Battery

A separator prepared from polypropylene and having a thickness of 16 μm was disposed between the positive electrode and the negative electrode, and the electrolyte was injected thereto to prepare a lithium secondary battery.

Example 10

Preparation of Positive Electrode

The positive electrode prepared in Example 1 was used as a positive electrode.

Preparation of Negative Electrode

The negative electrode prepared in Example 5 was used as a negative electrode.

Preparation of Electrolyte 1 vol % of maleic anhydride (MA), based on a total volume of an electrolyte, was added to 1.15 M $LiPF_6$ mixed with EC, FEC, EMC, and DMC (at a volume ratio of 7:7:46:40), and 2 wt % of LiFSI ($(FSO_2)_2NLi$) and 1 wt % of MMDS, based on a total weight of the electrolyte, were further added thereto to prepare the electrolyte.

Preparation of Lithium Secondary Battery

A separator prepared from polypropylene and having a thickness of 16 μm was disposed between the positive electrode and the negative electrode, and the electrolyte was injected thereto to prepare a lithium secondary battery.

Example 11

A lithium secondary battery was prepared in substantially the same manner as in Example 10, except that $LiNi_{0.85}Co_{0.1}Mn_{0.05}O_2$ was used in place of $LiNi_{0.8}Co_{0.15}Al_{0.05}O_2$ as a positive active material, and 0.5 wt % of MMDS was added to an electrolyte, based on a total weight of the electrolyte.

Comparative Example 8

A lithium secondary battery was prepared in substantially the same manner as in Example 11, except that MMDS was not used in preparation of an electrolyte.

Example 12

A lithium secondary battery was prepared in substantially the same manner as in Example 11, except that $LiNi_{0.88}Co_{0.1}Mn_{0.02}O_2$ was used in place of $LiNi_{0.85}Co_{0.1}Mn_{0.05}O_2$ as a positive active material.

Comparative Example 9

A lithium secondary battery was prepared in substantially the same manner as in Example 9, except that MMDS was not used in preparation of an electrolyte.

Comparative Example 10

A lithium secondary battery was prepared in substantially the same manner as in Example 9, except that $LiCoO_2$ was used as a positive active material.

Comparative Example 11

A lithium secondary battery was prepared in substantially the same manner as in Example 9, except that $LiNi_{0.5}Co_{0.45}Al_{0.05}O_2$ was used as a positive active material.

Evaluation Example 1

Evaluation of Lifespan and Resistance

The lithium secondary batteries prepared in Examples 1 to 12 and Comparative Examples 1 to 11 were subject to 300 charge/discharge cycles at a temperature of 45° C., under a charge/discharge current of 1 C/1 C, an operating voltage in a range of about 2.8 V to about 4.3 V, and a cut-off current in a CC-CV mode of 1/10 C. Then, an increase in DCIR and lifespan of the lithium secondary batteries were evaluated. The results of the evaluation are shown in Table 1.

TABLE 1

|  | Lifespan (%) | DCIR increase (%) |
| --- | --- | --- |
| Example 1 | 74 | 132 |
| Comparative Example 1 | 71 | 192 |
| Example 2 | 76 | 135 |
| Comparative Example 2 | 72 | 202 |
| Example 3 | 78 | 138 |
| Example 4 | 86 | 124 |
| Comparative Example 3 | 62 | 131 |
| Example 5 | 76 | 127 |
| Comparative Example 4 | 76 | 158 |
| Example 6 | 74 | 125 |
| Comparative Example 5 | 74 | 156 |
| Example 7 | 78 | 118 |
| Comparative Example 6 | 87 | 142 |
| Example 8 | 83 | 119 |
| Example 9 | 82 | 115 |
| Comparative Example 7 | 71 | 112 |
| Example 10 | 77 | 109 |
| Example 11 | 83 | 112 |
| Comparative Example 8 | 83 | 141 |
| Example 12 | 82 | 114 |
| Comparative Example 9 | 83 | 145 |
| Comparative Example 10 | 62 | 127 |
| Comparative Example 11 | 61 | 121 |

Referring to Table 1, the lithium secondary batteries prepared in Examples 1 to 12 were found to exhibit a low DCIR increase as compared with the lithium secondary batteries of the Comparative Examples, which were prepared in the same manner except for the omission of a disulfonate additive. In other words, the lithium secondary batteries of Examples 1 to 12 were found to have reduced resistance. In addition, the lithium secondary battery of Comparative Example 3 including 2.2 wt % of a disulfonate additive was found to have a reduced DCIR increase but a greater decrease in lifespan. The lithium secondary batteries of Comparative Examples 5 and 6 including a phosphine additive in place of a disulfonate additive were each found to have a sustained lifespan, but were also found to have a much higher increase in DCIR increase.

Accordingly, the lithium secondary batteries of Examples 1 to 12 were found to have excellent lifespan characteristics and a reduced increase in the DCIR.

Evaluation Example 2

Evaluation on Amount of Generated Gas

The lithium secondary batteries of Examples 1 to 10 and Comparative Examples 1 to 8 were allowed to stand for 30 days at 60° C. Thereafter, an amount of generated gas was measured. The results of measurement are shown in Table 2.

TABLE 2

|  | Amount of generated gas (mL/g) |
| --- | --- |
| Example 1 | 0.9 |
| Comparative Example 1 | 1.5 |
| Example 2 | 1.1 |
| Comparative Example 2 | 1.6 |
| Example 3 | 1.2 |
| Example 4 | 1.0 |
| Comparative Example 3 | 0.9 |
| Example 5 | 0.9 |
| Comparative Example 4 | 1.3 |
| Example 6 | 0.9 |
| Comparative Example 5 | 1.4 |
| Example 7 | 0.9 |
| Comparative Example 6 | 1.4 |
| Example 8 | 1.0 |
| Comparative Example 7 | 0.6 |
| Example 9 | 0.8 |
| Example 10 | 0.8 |
| Comparative Example 8 | 1.3 |

Referring to Table 2, the lithium secondary batteries of Example 1 to 10 were found to have low amount of generated gas as compared with the lithium secondary batteries of the Comparative Examples, which were prepared in the same manner except for omission of disulfonate additive. Accordingly, the lithium secondary batteries of Examples 1 to 10 may prevent generation of gas upon storage at a high temperature, to thereby improve the safety and performance of the batteries.

Evaluation Example 3

Evaluation on Capacity of Battery

The lithium secondary batteries of Example 1 and Comparative Examples 10 and 11 were each charged at room temperature (of about 25□) with a constant current at a 0.2 C rate to a voltage of 4.3 V, then with a constant voltage of 4.3 V to a current at 0.05 C, and then discharged at a constant current at a 0.2 C rate to a voltage of 2.8 V in the $1^{st}$ cycle. An initial discharge capacity of each of the lithium secondary batteries was measured. The results of measurement are shown in Table 3.

TABLE 3

| | Initial capacity (mAh) |
|---|---|
| Example 1 | 480 |
| Comparative Example 10 | 336 |
| Comparative Example 11 | 372 |

Referring to Table 3, the lithium secondary battery of Example 1 including a Ni-rich positive active material, was found to have very large initial capacity as compared with the lithium secondary batteries of Comparative Examples 10 and 11 including nickel at amounts lower than in the lithium secondary battery of Example 1. Therefore, the lithium secondary battery of Example 1 was found to have excellent battery characteristics.

As apparent from the foregoing description, a lithium secondary battery may have an increased amount of nickel in a positive active material, thus having increased capacity, and also a certain amount of disulfonate in an electrolyte, thus having improved lifespan and resistance characteristics.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described, it will be understood by those of ordinary skill in the art that various changes in form and details may be made therein without departing from the spirit and scope as defined by the following claims.

What is claimed is:

1. A lithium secondary battery comprising:
a positive electrode comprising a positive active material represented by Formula 1;
a negative electrode; and
an electrolyte disposed between the positive electrode and the negative electrode, the electrolyte comprising a lithium salt, a nonaqueous solvent, and a cyclic compound represented by Formula 2, wherein an amount of the cyclic compound is less than about 2 percent by weight based on a total weight of the electrolyte,

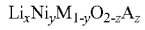

Formula 1

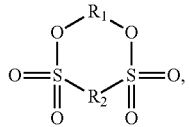

Formula 2 wherein, in Formulae 1 and 2,
$0.9 \leq x \leq 1.2$, $0.7 \leq y \leq 0.95$, $0 \leq z \leq 0.2$,
M comprises Al, Mg, Mn, Co, Fe, Cr, V, Ti, Cu, B, Ca, Zn, Zr, Nb, Mo, Sr, Sb, W, Bi, or a combination thereof,
A comprises a monovalent anion, a divalent anion, a trivalent anion, or a combination thereof, and
$R_1$ and $R_2$ are each independently a substituted or unsubstituted $C_1$-$C_{30}$ alkylene group,
wherein a substituent of the substituted $C_1$-$C_{30}$ alkylene group comprises a halogen, a methyl group, an ethyl group, a propyl group, an iso-propyl group, a butyl group, a tert-butyl group, a trifluoromethyl group, a tetrafluoroethyl group, a vinyl group, a propenyl group, a butenyl group, or a combination thereof,
wherein the nonaqueous solvent comprises fluorinated ethylene carbonate, ethylene carbonate, and vinylene carbonate,
wherein, an amount of the fluorinated ethylene carbonate is about 7 volume percent or less, based on a total volume of the nonaqueous solvent,
wherein the vinylene carbonate is contained in an amount of less than 2 percent by volume, based on a total volume of the electrolyte.

2. The lithium secondary battery of claim 1, wherein the amount of the cyclic compound is in a range of about 0.1 weight percent to about 1 weight percent, based on the total weight of the electrolyte.

3. The lithium secondary battery of claim 1, wherein $R_1$ and $R_2$ are each independently a substituted or unsubstituted methylene group or a substituted or unsubstituted ethylene group.

4. The lithium secondary battery of claim 1, wherein the lithium salt comprises lithium difluoro(oxalate)borate, $LiBF_4$, $LiPF_6$, $LiCF_3SO_3$, $(CF_3SO_2)_2NLi$, $(FSO_2)_2NLi$, or a combination thereof.

5. The lithium secondary battery of claim 4, wherein the lithium salt comprises lithium difluoro(oxalate)borate and $LiPF_6$, and wherein an amount of lithium difluoro(oxalate)borate is about 2 weight percent or less, based on the total weight of the electrolyte.

6. The lithium secondary battery of claim 4, wherein the lithium salt comprises $(FSO_2)_2NLi$ and $LiPF_6$, and wherein an amount of $(FSO_2)_2NLi$ is about 10 weight percent or less, based on the total weight of the electrolyte.

7. The lithium secondary battery of claim 1,
wherein the electrolyte further comprises maleic anhydride, succinic anhydride, or a combination thereof, and
wherein the maleic anhydride, succinic anhydride, or combination thereof are contained in an amount of less than about 2 percent by volume, based on a total volume of the electrolyte.

8. The lithium secondary battery of claim 7, wherein the electrolyte comprises maleic anhydride in an amount of less than about 2 volume percent, based on a total volume of the electrolyte.

9. The lithium secondary battery of claim 1, wherein the electrolyte further comprises an additive comprising a phosphine compound, a phosphite compound, a phosphate compound, or a combination thereof.

10. The lithium secondary battery of claim 9, wherein the electrolyte comprises the additive in an amount of less than about 3 weight percent, based on the total weight of the electrolyte.

11. The lithium secondary battery of claim 1, wherein, in Formula 1, $0.8 \leq y \leq 0.95$.

12. The lithium secondary battery of claim 1, wherein the positive active material is represented by Formula 3 or Formula 4:

$$LiNi_{y'}Co_{1-y'-z'}Al_{z'}O_2, \text{ or} \qquad \text{Formula 3}$$

$$LiNi_{y'}Co_{1-y'-z'}Mn_{z'}O_2, \qquad \text{Formula 4}$$

wherein, in Formulae 3 and 4, $0.8 \leq y' \leq 0.95$, $0 < z' < 0.1$, and $0 < 1-y'-z' < 0.2$.

13. The lithium secondary battery of claim 1, wherein the positive electrode comprises $LiNi_{0.8}Co_{0.15}Al_{0.05}O_2$, $LiNi_{0.88}Co_{0.1}Al_{0.02}O_2$, $LiNi_{0.85}Co_{0.1}Al_{0.05}O_2$, $LiNi_{0.8}Co_{0.15}Mn_{0.05}O_2$, $LiNi_{0.88}Co_{0.1}Mn_{0.02}O_2$, $LiNi_{0.85}Co_{0.1}Mn_{0.05}O_2$, or a combination thereof.

14. The lithium secondary battery of claim 1, wherein the negative electrode comprises a negative active material comprising a metalloid which is alloyable with lithium, or a carbonaceous negative active material.

15. The lithium secondary battery of claim 14, wherein the negative active material comprising the metalloid which alloyable with lithium comprises silicon, a silicon-carbon composite, $SiO_{a'}$, wherein $0<a'<2$, or a combination thereof.

16. The lithium secondary battery of claim 1, wherein the silicon-carbon composite comprises silicon particles having an average diameter of about 200 nanometers or less.

17. The lithium secondary battery of claim 1, wherein, after 300 cycles of charging and discharging at a temperature of about 45° C., an increase in direct current internal resistance is less than about 150%.

18. The lithium secondary battery of claim 1, wherein the lithium secondary battery has a cell energy density of about 500 watt hours per liter or greater.

19. The lithium secondary battery of claim 1, wherein the positive active material is represented by Formula 3 or Formula 4:

$$LiNi_{y'}Co_{1-y'-z'}Al_{z'}O_2, \text{ or} \qquad \text{Formula 3}$$

$$LiNi_{y'}Co_{1-y'-z'}Mn_{z'}O_2, \qquad \text{Formula 4}$$

wherein, in Formulae 3 and 4, $0.8<y'\le0.95$, $0<z'<0.1$, and $0<1-y'-z'<0.2$.

20. A method of preparing a lithium secondary battery, the method comprising:
  providing a positive electrode comprising a positive active material represented by Formula 1;
  providing a negative electrode; and
  disposing an electrolyte between the positive electrode and the negative electrode, the electrolyte comprising a lithium salt, a nonaqueous solvent, and a cyclic compound represented by Formula 2, wherein an amount of the cyclic compound is less than about 2 percent by weight, based on a total weight of the electrolyte, $$Li_xNi_yM_{1-y}O_{2-z}A_z \qquad \text{Formula 1}$$

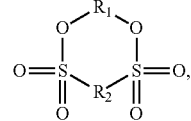

Formula 2 wherein, in Formulae 1 and 2,
$0.9\le x\le 1.2$, $0.7\le y\le 0.95$, $0\le z<0.2$,
M comprises Al, Mg, Mn, Co, Fe, Cr, V, Ti, Cu, B, Ca, Zn, Zr, Nb, Mo, Sr, Sb, W, Bi, or a combination thereof,
A comprises a monovalent anion, a divalent anion, a trivalent anion, or a combination thereof, and
$R_1$ and $R_2$ are each independently a substituted or unsubstituted $C_1$-$C_{30}$ alkylene group,
wherein a substituent of the substituted $C_1$-$C_{30}$ alkylene group comprises a halogen, a methyl group, an ethyl group, a propyl group, an iso-propyl group, a butyl group, a tert-butyl group, a trifluoromethyl group, a tetrafluoroethyl group, a vinyl group, a propenyl group, a butenyl group, or a combination thereof,
wherein the nonaqueous solvent comprises fluorinated ethylene carbonate, ethylene carbonate, and vinylene carbonate,
wherein, an amount of the fluorinated ethylene carbonate is about 7 volume percent or less, based on a total volume of the nonaqueous solvent,
wherein the vinylene carbonate is contained in an amount of less than 2 percent by volume, based on a total volume of the electrolyte.

* * * * *